Aug. 2, 1927.   
E. G. NELSON, JR   
1,637,452
DELIVERY APPARATUS FOR MOLTEN GLASS
Filed Jan. 6, 1926
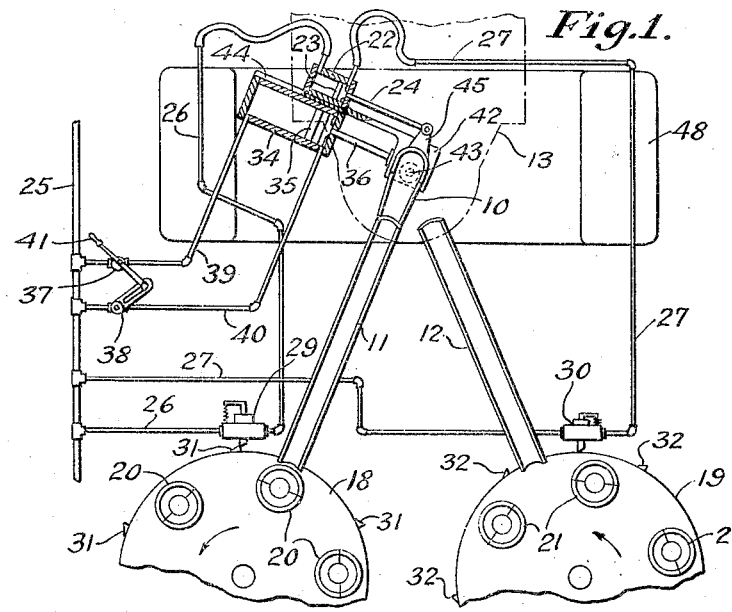
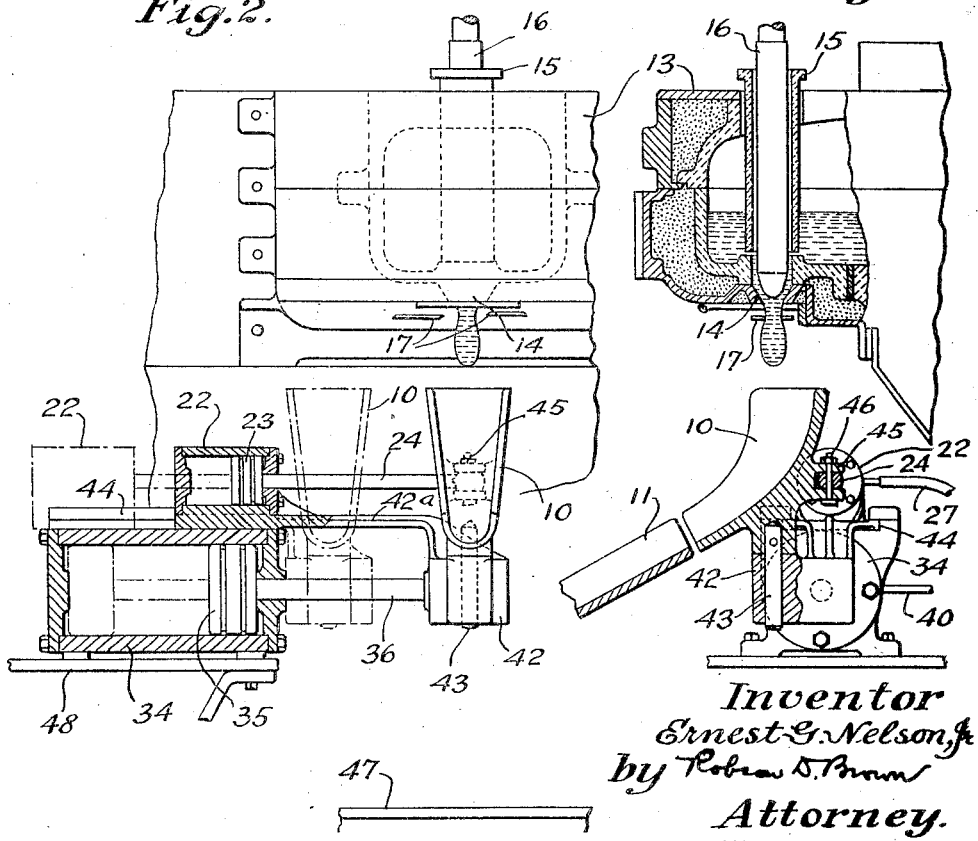
Inventor  
Ernest G. Nelson, Jr  
by Robert D. Brown  
Attorney.

Patented Aug. 2, 1927.

1,637,452

UNITED STATES PATENT OFFICE.

ERNEST G. NELSON, JR., OF HARTFORD, CONNECTICUT, ASSIGNOR TO HARTFORD-EMPIRE COMPANY, OF HARTFORD, CONNECTICUT, A CORPORATION OF DELAWARE.

DELIVERY APPARATUS FOR MOLTEN GLASS.

Application filed January 6, 1926. Serial No. 79,563.

My invention relates to apparatus for delivering charges of molten glass to the molds of glassware shaping machines, and it relates more particularly to mechanism adapted to deliver mold charges from one glass feeder to the molds of a plurality of shaping machines.

One object of my invention is to provide an improved mechanism for mounting and oscillating a deflector or scoop block to deliver mold charges of molten glass to a plurality of shaping machines, and for moving the deflector into and out of glass-receiving position. This improved mechanism includes a fluid-pressure cylinder connected to move the deflector periodically to direct the mold charges alternately to the shaping machines, and another fluid-pressure cylinder connected to move the deflector into and out of glass-receiving position when desired. As specifically shown herein, the cylinder which oscillates the deflector is mounted slidably upon the cylinder which moves the deflector into and out of glass-receiving position.

Another object of this invention is to provide an improved delivery apparatus which shall be controlled pneumatically by the operation of the several shaping machines, to deliver charges of glass thereto in the proper timed relation to the movements of the machines.

Other objects of the invention include such novel features of construction and arrangement of parts as are disclosed in the following specification and drawings, and specifically set forth in the appended claims.

In the drawings:

Figure 1 is a diagrammatic illustration of a glass delivery apparatus embodying my invention;

Fig. 2 is an enlarged side view in elevation, with parts in section, of a portion of the structure shown in Fig. 1, and Fig. 3 is an end view of the parts shown in Fig. 2.

The invention is illustrated as incorporated in an apparatus for delivering glass from a feeding mechanism to the molds of a plurality of shaping machines. The feeding and shaping mechanisms may be of any well-known or desired type and form no part of the present invention.

In the preferred embodiment of the invention, a laterally movable deflector or scoop block for receiving mold charges of glass from the feeder is shown as mounted on a vertical pivot beneath the feeder outlet and actuated by a fluid-pressure mechanism in timed relation with the movement of the molds on the shaping machines, so that the deflector may be moved to deliver mold charges to the molds of the several machines at the proper times. When it is desired to stop the delivery operation, the scoop block with its operating mechanism is moved to one side of the feeder outlet by an independently operated fluid-pressure mechanism.

Referring to Fig. 1 of the drawing, there is illustrated a glass delivery apparatus embodying the present invention in which a laterally movable deflector or scoop block 10 and cooperating inclined delivery troughs 11 and 12 serve to distribute glass mold charges to suitable glassware shaping machines. The deflector is disposed beneath the feeding outlet of any suitable glass feeder which is shown in Fig. 2 as comprising a forehearth 13 connected to a glass melting tank, not shown. The forehearth is provided with a discharge outlet 14 and the flow of glass from the outlet is regulated by means of a tube 15 and a plunger 16 to form mold charges of the desired size and shape, which are severed by shears 17. The operating mechanisms for the feeder are not shown as they form no part of the present invention.

The shaping machines may be of any desired type and for the purpose of illustrating the invention, two rotary machines indicated by numerals 18 and 19 are each provided with a plurality of molds 20 and 21 to which mold charges are supplied by the chutes 11 and 12, leading from the deflector 10 to the several machines.

The deflector 10 is pivotally mounted beneath the feeder outlet and is periodically swung on its axis to cooperate with the delivery chutes 11 and 12. This swinging movement of the deflector is effected by a fluid-operated mechanism comprising a fluid pressure cylinder 22 having a reciprocating piston 23, and a piston rod 24 connected to the deflector. Compressed air or other motive fluid for operating the piston is supplied from any convenient source indicated by the conduit 25 and is distributed by conduits 26 and 27 which connect with the ends of the cylinder 22.

The admission of fluid to the cylinder 22 for reciprocating the piston 23 and thereby periodically oscillating the scoop block is controlled by trip valves 29 and 30 which are actuated by the movement of the respective shaping machines. As shown, the machine 18 is provided with trips 31 which actuate the control valve 29 during each movement of the table, and the valve 30 is actuated in a similar manner by trips 32 on the machine 19. By the above construction the movements of the scoop block for delivering mold charges is controlled by the movement of the molds to which charges of glass are to be supplied.

The invention further contemplates providing a movable support for the scoop block and its operating mechanism that shall be independently operable to remove the deflector from its glass-receiving position. The movement of the deflector into and out of glass-receiving position is controlled by a fluid-pressure cylinder 34 having a piston 35 and a piston rod 36 which is connected to the deflector support 42. The piston 35 may be operated from the fluid-pressure source 25, and the admission of fluid at the ends of cylinder 34 is controlled by three-way valves 37 and 38 which are located in conduits 39 and 40 communicating therewith and are arranged to connect the conduits 39 and 40 alternately to the pressure line and to exhaust ports. In order to facilitate the manipulation of the valves, they are coupled together by a manually operated lever 41 which insures the proper opening and closing thereof.

While I have shown an independent manually operated device for controlling the operation of the fluid piston 35, it is obvious that the manipulation of the valves 37 and 38 may be effected automatically by apparatus operated simultaneously by the starting and stopping of the feeder or the shaping machines, thereby insuring that the deflector will be withdrawn from delivery position during the stoppage of the feeder or of the shaping machines.

The deflector support comprises a head 42, secured to one extremity of the piston rod 36, upon which the deflector is pivotally mounted by a pin 43. The head 42 also carries a bracket 42ª which forms a supporting base for the cylinder 22, thus maintaining the deflector and its actuating mechanism in fixed relation. As shown, that portion of the bracket 42ª supporting the cylinder 22 is slidable in suitable guides 44 on the top of the cylinder 34. The piston rod 24 is connected to an offset portion 45 of the deflector 10 by a pin 46. Thus the reciprocation of the piston 24 causes the reflector to swing about its axis 43 into alignment with one of the troughs 11 and 12 at each reciprocation.

By providing a fluid-actuated deflector and its support in the manner set forth, a compact and simplified apparatus is produced, and this feature of construction is particularly desirable due to the limited space usually available for such installations.

When it is desired to interrupt the delivery of mold charges to the troughs 11 and 12, the scoop block is moved aside from the line of glass delivery by admitting fluid pressure to the cylinder 34 and thereby retracting the piston 35 to the dotted line position shown in Fig. 2. When the piston is retracted, the deflector actuating cylinder slides over the supporting cylinder 34 without disturbing the deflector actuating mechanism.

The swinging movement of the scoop may continue when the scoop is in its inoperative position, or if desired, the swinging of the scoop may cease. By thus removing the delivery mechanism from the path of the discharged glass, the glass is permitted to pass into a cullet receptacle 47 without contacting with any portion of the delivery apparatus. The cylinder 34, which forms the principal support for the deflector and its associated operating mechanism, is mounted upon a suitable base 48 which may form an integral part of the feeder frame.

By providing pneumatically operated mechanisms of the character described for manipulating the deflector, the working parts are reduced to a minimum and the deflector may be operated with greater efficiency than similar mechanical devices now employed for a like purpose.

Variations in the construction and arrangement of parts may be made within the scope of my invention, as set forth in the appended claims.

I claim as my invention:

1. A glass delivering apparatus adapted to receive charges of molten glass from a glass feeder and deliver them to a plurality of glassware shaping machines, comprising a deflector, a movable support for the deflector, means for moving the deflector on said support to deliver charges of glass alternately to the shaping machines, and means for moving the support and the deflector bodily into and out of glass-receiving position.

2. A glass delivering apparatus adapted to receive mold charges of molten glass from a glass feeder and deliver them to a plurality of glassware shaping machines, comprising a deflector, a movable support for the deflector, a fluid-pressure mechanism for moving the deflector to deliver charges of glass alternately to the shaping machines, and means for moving the support and deflector horizontally into and out of glass-receiving position.

3. A glass delivering apparatus adapted to receive mold charges of molten glass from a glass feeder and deliver them to a plurality of glassware shaping machines, comprising a deflector, a movable support for the deflector, a fluid-pressure mechanism for moving said deflector to deliver charges of glass alternately to the shaping machines, and fluid pressure mechanism for moving the deflector into and out of glass-receiving position.

4. A glass delivering apparatus adapted to receive mold charges of molten glass from a glass feeder and deliver them to a plurality of glassware shaping machines, comprising a deflector, a fluid-pressure mechanism arranged to support the deflector and to move the deflector into and out of glass-receiving position, and a second fluid-pressure mechanism carried by the said supporting mechanism for operating the deflector to deliver charges of glass alternately to the shaping machines.

5. A glass delivering apparatus adapted to deliver mold charges from a feeding mechanism to a plurality of molds, comprising a pivotally mounted deflector, said deflector having its pivot axis in alignment with the axis of the feeder outlet, means for operating the deflector to deliver mold charges to the desired molds, and means for moving the axis of the deflector laterally out of axial alignment with the axis of said outlet to interrupt the delivery of glass to said molds.

6. A glass delivering apparatus adapted to receive charges of molten glass from a glass feeder and deliver them to a plurality of sets of movable molds, comprising a pivotally mounted deflector, a conduit associated with each set of molds, fluid-pressure means coordinated with the movement of the molds for moving the deflector on its pivot axis to direct mold charges alternately to the said conduits, and means for moving said deflector bodily in a lateral direction out of operative position relative to said feeder.

7. A delivery apparatus for mold charges of molten glass, comprising a deflector, a support for the deflector, a fluid-pressure cylinder and piston also mounted on said support and adapted to operate said deflector, a rigidly mounted fluid pressure cylinder and a piston therefor, said piston being connected to move said support and to thereby move the deflector into and out of glass-receiving position.

8. A delivery apparatus for mold charges of molten glass comprising a deflector, a fluid-pressure cylinder having a piston arranged to move the deflector into and out of glass-receiving position, a second fluid-pressure cylinder and piston for oscillating said deflector, said second cylinder being slidably mounted on said first-named cylinder.

9. The combination with apparatus for feeding charges of molten glass, of a plurality of glassware shaping machines, a cullet pit, fluid-operated means controlled by the movement of said shaping machines for delivering successive mold charges alternately to said shaping machines, and fluid-pressure operated means for withdrawing the delivery apparatus from glass-receiving position, whereby the charges fall into the cullet pit free of said delivery apparatus.

10. Apparatus for receiving mold charges of molten glass from a glass feeder and for delivering them alternately to a plurality of glassware shaping machines, comprising a fixed support, a fluid-pressure cylinder carried by said support and provided with a guideway, a slidable support arranged to slide in said guideway, a mold-charge deflector carried by said slidable support and pivotally movable about a vertical axis, and a second fluid-pressure cylinder carried by said support and having its piston rod connected to oscillate said deflector about its pivot, the piston rod of said first-named cylinder being connected to said support for sliding said slidable support back and forth and for thereby moving said deflector into and out of glass-receiving position.

Signed at Hartford, Conn., this 4th day of January, 1926.

ERNEST G. NELSON, Jr.